PACKAGING APPARATUS

Filed Feb. 9, 1956 2 Sheets-Sheet 1

INVENTOR.
ANTHONY F. LABROZZI
PETER J. D'ORAZIO
BY
Donald S. Cohen
ATTORNEY

PACKAGING APPARATUS

Filed Feb. 9, 1956 2 Sheets-Sheet 2

INVENTOR.
ANTHONY F. LABROZZI
PETER J. D'ORAZIO
BY
Donald S. Cohen
ATTORNEY

United States Patent Office 2,907,158

Patented Oct. 6, 1959

2,907,158

PACKAGING APPARATUS

Anthony F. Labrozzi and Peter J. D'Orazio, Philadelphia, Pa., assignors to International Resistance Company, Philadelphia, Pa.

Application February 9, 1956, Serial No. 564,460

8 Claims. (Cl. 53—126)

This invention relates to apparatus for packaging elongated objects in an orderly manner. More particularly, it relates to apparatus for arranging free from entanglement in a container, electronic components, such as resistors, of the type having an elongated body with a lead extending longitudinally from each end.

In the electronic industry, the present trend is toward automation in the manufacture of various electronic equipment, such as radio and television sets. Wherein the various electronic components, such as resistors, capacitors and rectifiers, that go into the electrical circuit making up the equipment, are handled and assembled automatically by machines. It is therefore desirable for the manufacturers of such equipment to receive such components arranged in such a manner that they may be easily fed into such machines.

Many of these components are of the type having an enlarged elongated body with the electronic element, such as a resistor, hermetically enclosed in a casing of molded plastic, or a metal or glass sleeve; thin wire leads extend from each end of such body. Because of the light weight and the particular shape of these components, if merely poured into a container or a box, they will turn both vertically and horizontally in a jumbled, entangled mass. Therefore, to provide an orderly arranged package, it has been necessary either to arrange the components by hand or to use specially constructed containers such as is shown in United States Patent No. 2,135,134 to G. M. Ehlers, issued November 1, 1938, and No. 2,214,230 to W. S. Freeburg, issued September 10, 1940, both of which methods are time consuming and expensive.

It is therefore an object of this invention to provide an apparatus for arranging such elongated objects, such as electronic components, in a container in an orderly, substantially parallel manner. It is a further object to provide an apparatus which will quickly and easily arrange a continuous flow of such elongated objects to a container, in such orderly fashion.

Another object is to provide an apparatus for arranging electronic components of the type having elongated bodies with lead wires extending from each end in a container with the components being substantially parallel and free from entanglement. Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, Figure 1 is a perspective view of the packaging apparatus;

Similar reference characters refer to similar parts throughout the several views of the drawing.

Figures 1, 2:
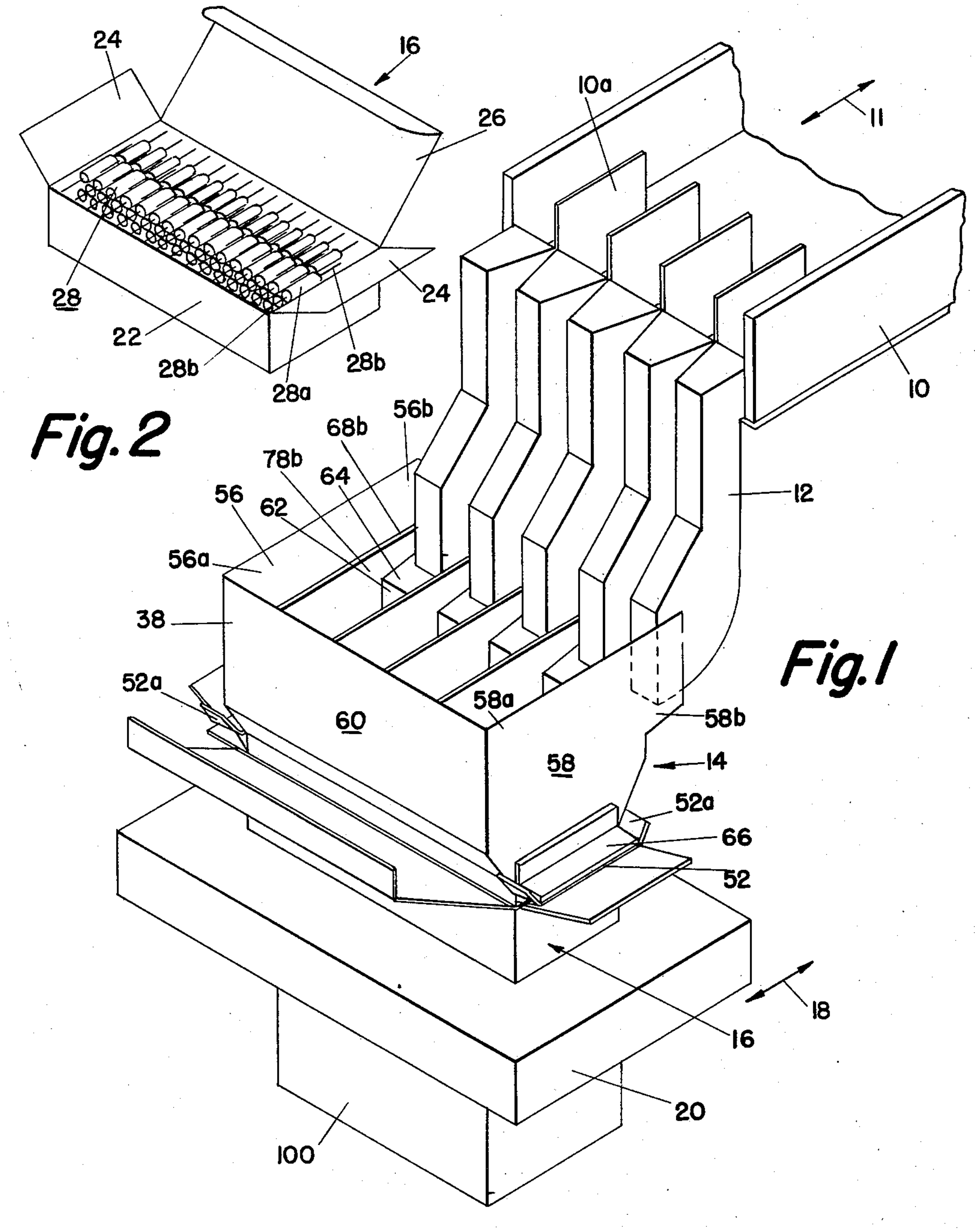
Figure 2 is a perspective view of a container having electrical components such as resistors arranged therein.

Referring to Figure 1 of the drawing, the apparatus in general comprises a feed trough 10, which is reciprocated in the direction of the arrow 11 by mechanism not shown in such a manner as to feed the articles to be packaged to chutes 12. The end of the trough 10 is provided with dividers **10*a*, which divide the stream of articles and guide them into chutes 12. The chutes 12 extend downwardly and are curved over and open into an arranger generally indicated at 14. The arranger 14 fits into a container 16 and both are reciprocated in the direction of arrow 18 by a table 20, on which they rest. The arranger 14, which will be described in detail later, is divided into a plurality of compartments and each compartment is provided with baffles which form a labyrinth passage. Thus, the articles to be packaged falling down the chutes 12 from the feed trough 10, drop into the various compartments of the arranger 14 and pass through the labyrinth passages, into the container 16**. The labyrinth passages cause the articles to fall into the container in a horizontal position and the reciprocation of the container arranges the articles in a nested parallel arrangement.

Figure 2 shows a package or container 16 of electronic components, such as resistors, capacitors, or rectifiers, made up using the apparatus as shown. The package may take the form of a rectangular box 22, having side flaps 24 and a cover 26. The electronic components 28 which comprise a central elongated body portion **28*a* with thin wire leads 28*b* extending from each end thereof are arranged in the box 22 in parallel layers. The components in each layer are all parallel to the ends of the box and are arranged in rows with the body portion 28*a* of each component resting on and between the body portions of two components in the underlying layer. As shown, the components in each layer are arranged in two rows, with the components in one row slightly offset from those in the other row so that the adjacent leads 28*b* of the components extend between the bodies 28*a*** of the components in the next row. However, if the components are larger, they may be arranged in only one row in each layer, or if smaller, in more than two rows. This arrangement of the components in the box not only provides an orderly arrangement but also allows for the maximum number of components to be packaged in the box.

Figure 3:
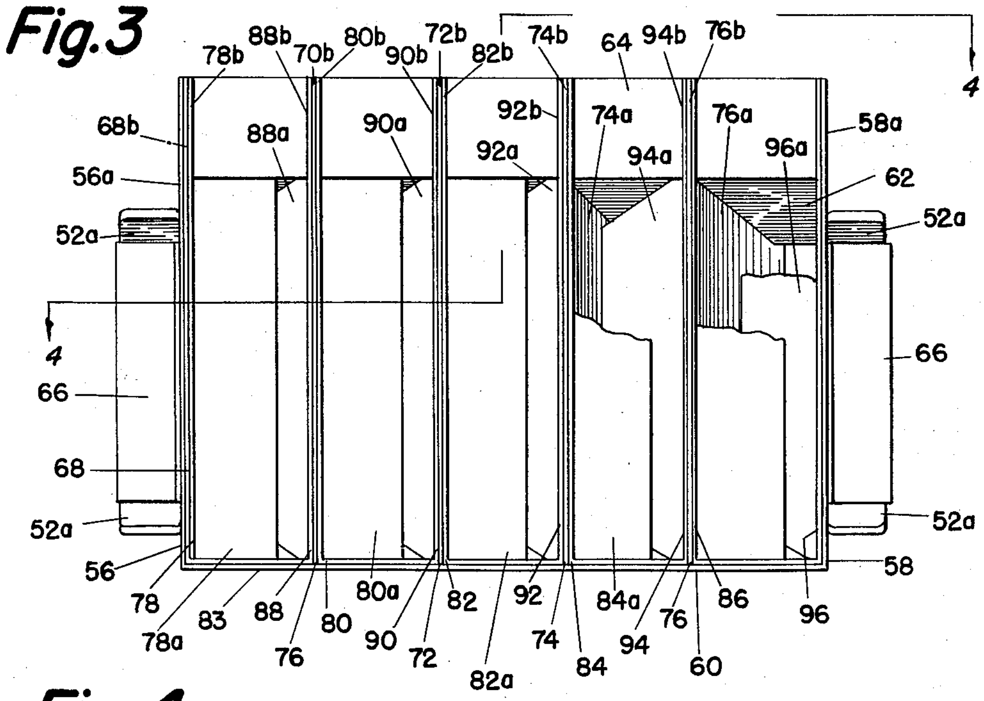
Figure 3 is a top plan view of the packaging apparatus partially broken away.
Figure 4:
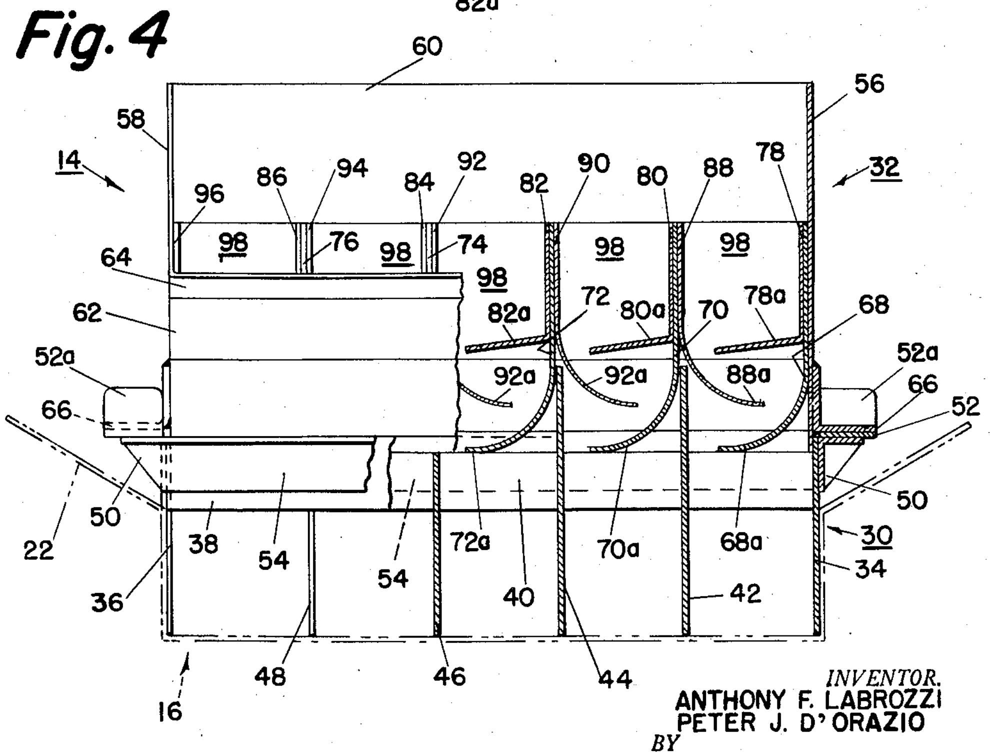
Figure 4 is a rear elevation of the apparatus partially broken away along line 4—4 of Figure 3.

Referring to Figures 3 and 4, the arranger 14 is made up of a lower section and an upper section generally indicated at 30 and 32 respectively. The lower section 30 is substantially rectangular and is of substantially the same length and width as the inside of the box 22 to be filled with components so that it fits therein. The lower section 30 comprises a pair of identical substantially rectangular end plates 34 and 36 connected in spaced parallel relation by side strips 38 and 40. Four identical substantially rectangular divider plates 42, 44, 46 and 48 are connected between the side strips 38 and 40 and are equally spaced between the end plates 34 and 36. The bottom edges of the divider plates and end plates are in alignment but the divider plates are taller than the end plates for reasons which will appear hereafter. An L-shaped bracket 50 is attached to the outside surface of each end plate 34 and 36 adjacent the top edge thereof and an elongated supporting ledge 52 is mounted on each bracket 50; the ends of supporting ledges 52 are bent upwardly to form flanges **52*a*. An L-shaped strip 54 is secured to the outside surface of the side strips 38 and 40** to reinforce the sides.

Upper section 32, which is supported on the lower section 30, is substantially rectangular and comprises a pair of identical end walls 56 and 58 connected in spaced parallel relation by side walls 60 and 62. The distance between end walls 56 and 58 is slightly less than that between end plates 34 and 36 of the lower section 30 so that they will interfit (Figure 4). As best seen in Figure 1, the end walls 56 and 58 are at their bottom edge substantially the same width as the end plates 34 and 36 of the lower section 30 and they taper to a wider portion 56*a* and 58*a* at the top portions thereof. Substantially rectangular rear portions 56*b* and 58*b* extend from plates 56 and 58 adjacent their top edge (Figure 1). The front side wall 60 extends throughout the entire height of the end walls 56 and 58 (Figures 1 and 4) while the rear side wall 62 extends from the bottom edge of the end walls to the bottom edge of the rear portions 56*b* and 58*b* (Figure 4) and a bottom plate 64 connects the bottom edges thereof. As best seen in Figure 4, a support ledge 66, preferably the same width as ledge 52 is secured to the outer surface of each end wall 56 and 58 adjacent their bottom edges to rest thereon thereby supporting the upper section 32 on the lower section 30.

Referring to Figure 4, a baffle plate 68 is attached to the inside surface of end wall 56 and extends across the full width thereof. Baffle plate 68 has an arcuate portion 68*a* which projects away from the end wall 56 and which ends substantially in the plane of the bottom edges of the end walls 56 and 58. The top edge of the baffle plate extends to a level slightly above the level of the bottom plate 64 and has a lip 68*b* extending thereover from its rear edge (Figure 3). Four more baffle plates 70, 72, 74 and 76, identical in size and shape to baffle plate 68, are secured between side walls 60 and 62 in equally spaced relation between baffle plate 68 and end wall 58 and parallel thereto. The baffle plates 68, 70, 72, 74 and 76 and end wall 58 form compartments 98 therebetween and the arcuate portions 68*a*, 70*a*, 72*a*, 74*a* and 76*a* are of a length to extend over half way across such compartments. A second baffle plate 78 is secured to the surface of first baffle plate 68 and extends across the full wdth thereof with a flange 78*a* projecting therefrom above the arcuate portion 68*a* and across the compartment 98 about the same distance as the arcuate portion 68*a*. Flange 78*a* is flat and extends downwardly at a slight angle from the horizontal and baffle plate 78 has a lip 78*b* projecting across the bottom plate 64. In the same manner, additional second baffle plates 80, 82, 84 and 86, identical in shape and size to baffle plate 78, are attached to first baffle plates 70, 72, 74 and 76 respectively. A third baffle plate 88 extends from the opposite side of compartment 98 with an arcuate bottom portion 88*a* projecting between baffle flange 78*a* and the arcuate portion 68*a*, has a lip 88*b* projecting across the bottom plate 64. Further plate 88 not only extends between but substantially over-laps flange 78*a* and plate 68. In the like manner identical additional third baffle plates 90, 92, 94 and 96 are provided in the other compartments 98 to form labyrinth passages through the compartments 98.

In operation, the lower section 30 of the arranger 14 is placed in the box 22 of the container 16 (Figure 4). The upper section 32 is then placed on the lower section 30 with the support ledges 66 resting on supporting ledges 52 and the bottom edges of the side walls 56 and 58 interfitting between side plates 34 and 36. The supporting ledge flanges 52*a* guide the support ledges 66 in place on the supporting ledge 52*a* and also prevent relative sidewise motion between the two sections of the arranger 14. The interfit between the side walls 56 and 58 and side plates 34 and 36 prevent end motion between the two sections. As can be seen in Figure 4, the divider plates 42, 44, 46 and 48 extend respectively into the space between the first baffles 70, 72, 74 and 76 and the third baffles 88, 90, 92 and 94 attached thereto so that compartments 98 are in effect extended into the box 22. The container 16 and the arranger 14 are placed on the table 20 (Figure 1) and positioned so that the chutes 12 extend over bottom plate 64 with each chute 12 being between a pair of divider walls forming the compartment 98 and opening into the compartment. Although the arranger shown has five compartments 98, it can be divided into any number of the compartments as long as the distance between the walls dividing the compartments is less than the length of the articles to be packaged.

The electronic components 28, such as resistors, are placed in feed trough 10 (Figure 1) and the operating mechanism for the trough 10 is turned on to feed the components 28 down to the chutes 12. Obviously, instead of the feed trough 10, any other feeding mechanism, such as a conveyor belt, may be used to feed the components 18 to the chutes 12. At substantially the same time, a reciprocating device 100 on which table 20 is mounted is started to reciprocate the table 20 and thus the container 16 and arranger 14, in the direction of arrow 18 (Figure 1). Dividers 10*a* at the end of feed trough 10 divide the stream of the components 28 being fed down the trough and guide the components into the various chutes 12. The chutes 12 guide the components 28 over the bottom plate 64 and into the respective compartments 98. Since, as previously stated, the dividing walls of the compartments 98 are spaced apart a distance less than the length of the components 28, the components must drop into the compartments with the ends of the leads 28*b* pointing toward the opposite side walls of each compartment. The components 28 in their passage through the respective compartments 98 first land on the baffle flanges 78*a*, 80*a*, 82*a*, 84*a* and/or 86*a*. Since these baffle flanges are flat and substantially horizontal, the components will dwell thereon until they assume a substantially horizontal position. However, since these flanges are slightly inclined, the reciprocation of the arranger 14 causes the components 28 to slide off of the flange. They then slide down the baffles 88, 90, 92, 94 or 96 and onto and down the lowest baffles 68, 70, 72, 74 or 76 from which they drop into the box 22. The baffles orient the components 28 to a horizontal position and substantially parallel to the ends of the arranger and maintain their position until the components drop into the box. After the components 28 are in the box 22, this position is maintained and they are arranged into the orderly staggered layers and rows as shown in Figure 2 by the reciprocation of the box 22. It has been found that to so arrange components of the type having a central body portion with thin leads extending from the ends thereof, and particularly such components having a body portion which is short as compared to the length of the leads, that the length of the stroke and the speed of the reciprocation should follow the formula:

$$AB^2=C$$

Where $A$=stroke in inches
$B$=speed in strokes per minute
$C$=a constant

The constant C varies with the relative length of the body portion of the components to the length of the leads. For a component in which the length of the body portion is approximately 10% to 25% of the total length of component, C equals approximately $6\times10^4$. For other sizes, the constant C can be determined experimentally.

When the box is filled, reciprocation of the feeding trough and arranger is stopped and the arranger is removed from the box leaving the components properly arranged therein. If desired with the cover of the container closed, the container may be reciprocated for a few strokes to re-orient any components which might have been slightly disarranged during the removal from the arranger 14.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. An apparatus for use in packaging elongated objects in a container in an oriented manner comprising the combination of a substantially rectangular lower portion adapted to fit into said container, means dividing said lower portion into a plurality of compartments, a substantially rectangular upper portion supported on said lower portion, means dividing said upper portion into a plurality of compartments which are in alignment with the compartments in said lower portion, means in each compartment in said upper portion forming a labyrinth passage and means for reciprocating said portions in the direction in which the articles extend.

2. An apparatus for use in packaging elongated objects in a container in an oriented manner comprising the combination of a substantially rectangular lower portion adapted to fit into said container, means dividing said lower portion into a plurality of compartments, and a substantially rectangular upper portion supported on said lower portion comprising a pair of end plates connected in spaced parallel relation by side plates, a plurality of divider walls spaced along and extending between said side plates and parallel to said end plates forming a plurality of compartments which are in alignment with the compartments in said lower portion, and means in each compartment in said upper portion forming a labyrinth passage.

3. The combination as set forth in claim 2 in which the means in each compartment forming a labyrinth passage comprises a plurality of baffles attached to the divider walls and extending partially across the compartment.

4. An apparatus for use in packaging elongated objects in a container in an oriented manner comprising the combination of a substantially rectangular lower portion comprising a pair of substantially rectangular end plates connected in spaced parallel relation by a pair of side strips, and a plurality of substantially rectangular divider plates spaced along and extending between said strips and parallel to said end plates forming a plurality of compartments in said lower portion, and a substantially rectangular upper portion supported on said lower portion comprising a pair of end plates connected in spaced parallel relation by side plates, a plurality of divider walls spaced along and extending between said side plates and parallel to said end plates forming a plurality of compartments which are in alignment with the compartments in said lower portion and means in each compartment in said upper portion forming a labyrinth passage.

5. An apparatus for use in packaging elongated objects in a container in an oriented manner comprising the combination of a substantially rectangular lower portion comprising a pair of substantially rectangular end plates connected in spaced parallel relation by a pair of side strips, a plurality of substantially rectangular divider plates spaced along and extending between said strips and parallel to said end plates forming a plurality of compartments in said lower portion, and a supporting ledge secured to and extending from each end plate and a substantially rectangular upper portion supported on said lower portion comprising a pair of end plates connected in spaced parallel relation by side plates, a supporting plate secured to and extending from each end plate and resting on the supporting ledges of said lower portion, a plurality of divider walls spaced along and extending between said side plates and parallel to said end plates forming a plurality of compartments which are in alignment with the compartments in said lower portion and means in each compartment in said upper portion forming a labyrinth passage.

6. The combination as set forth in claim 5 in which the supported plates are substantially the same width as the supporting ledges and the supporting ledges have an upwardly extending flange at each side to guide the supported plate in place and to prevent the upper portion from moving from side to side on the lower portion.

7. An apparatus for use in packaging elongated objects in a container in an oriented manner comprising the combination of a substantially rectangular lower portion comprising a pair of substantially rectangular end plates connected in spaced parallel relation by a pair of side strips, and a plurality of substantially rectangular divider plates spaced along and extending between said strips and parallel to said end plates forming a plurality of compartments in said lower portion, a substantially rectangular upper portion supported on said lower portion comprising a pair of end plates connected in spaced parallel relation by side plates, a plurality of divider walls spaced along and extending between said side plates and parallel to said end plates forming a plurality of compartments which are in alignment with the compartments in said lower portion and means in each compartment in said upper portion forming a labyrinth passage and means for reciprocating the two portions from side to side.

8. The combination as set forth in claim 7 in which the reciprocating means has a stroke to speed ratio according to the formula $$AB^2=C$$

where $A$=stroke in inches
$B$=speed in strokes per minute
$C$=a constant

References Cited in the file of this patent

UNITED STATES PATENTS

| | | |
|---|---|---|
| 2,236,890 | Bower et al. | Apr. 1, 1941 |
| 2,692,072 | Friedli | Oct. 19, 1954 |